Dec. 16, 1952     H. P. DOUYARD     2,621,458
DISK HARROW CARRIER
Filed June 3, 1949     3 Sheets-Sheet 1
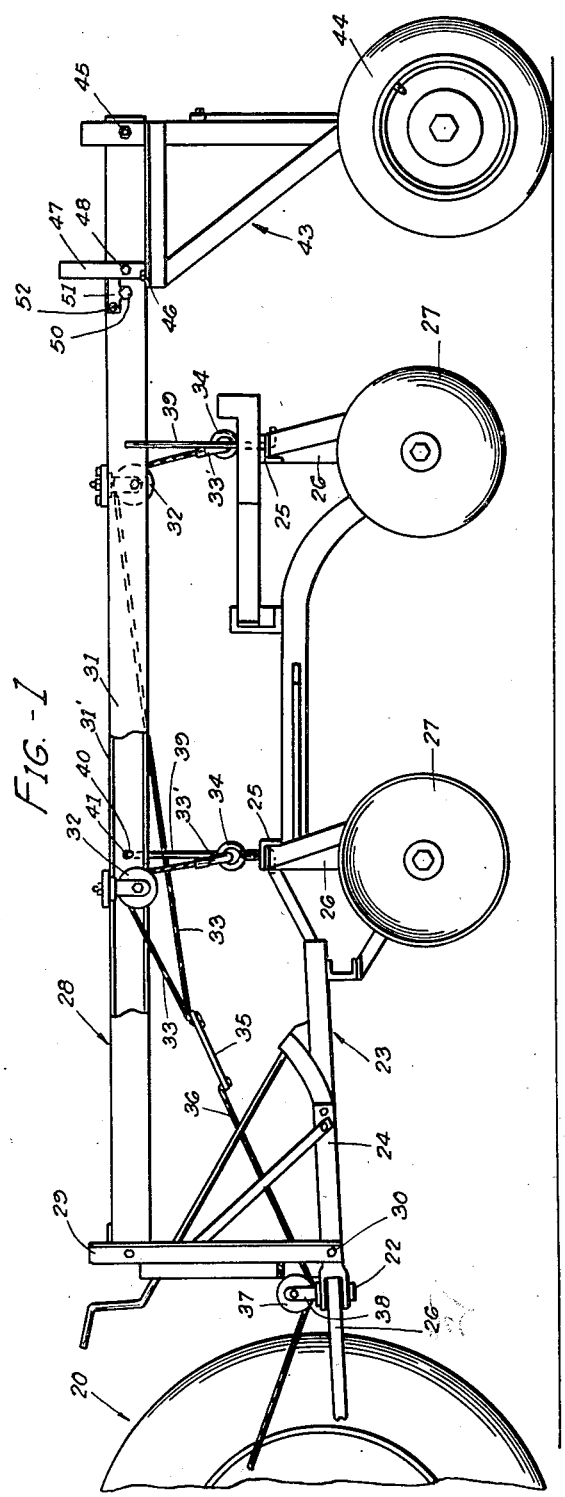
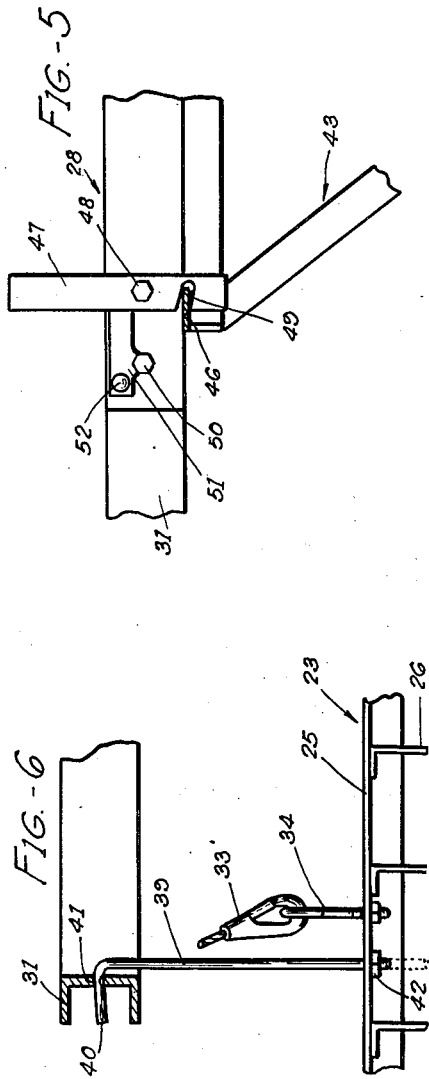
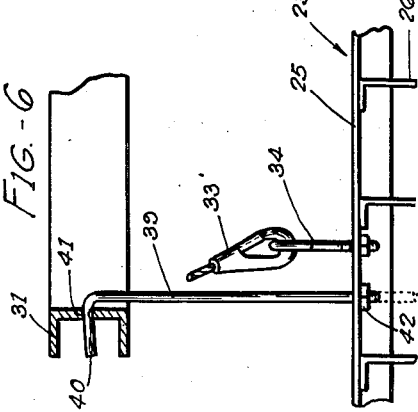
INVENTOR.
HERMAN P. DOUYARD
BY *Victor J. Evans & Co.*
ATTORNEYS

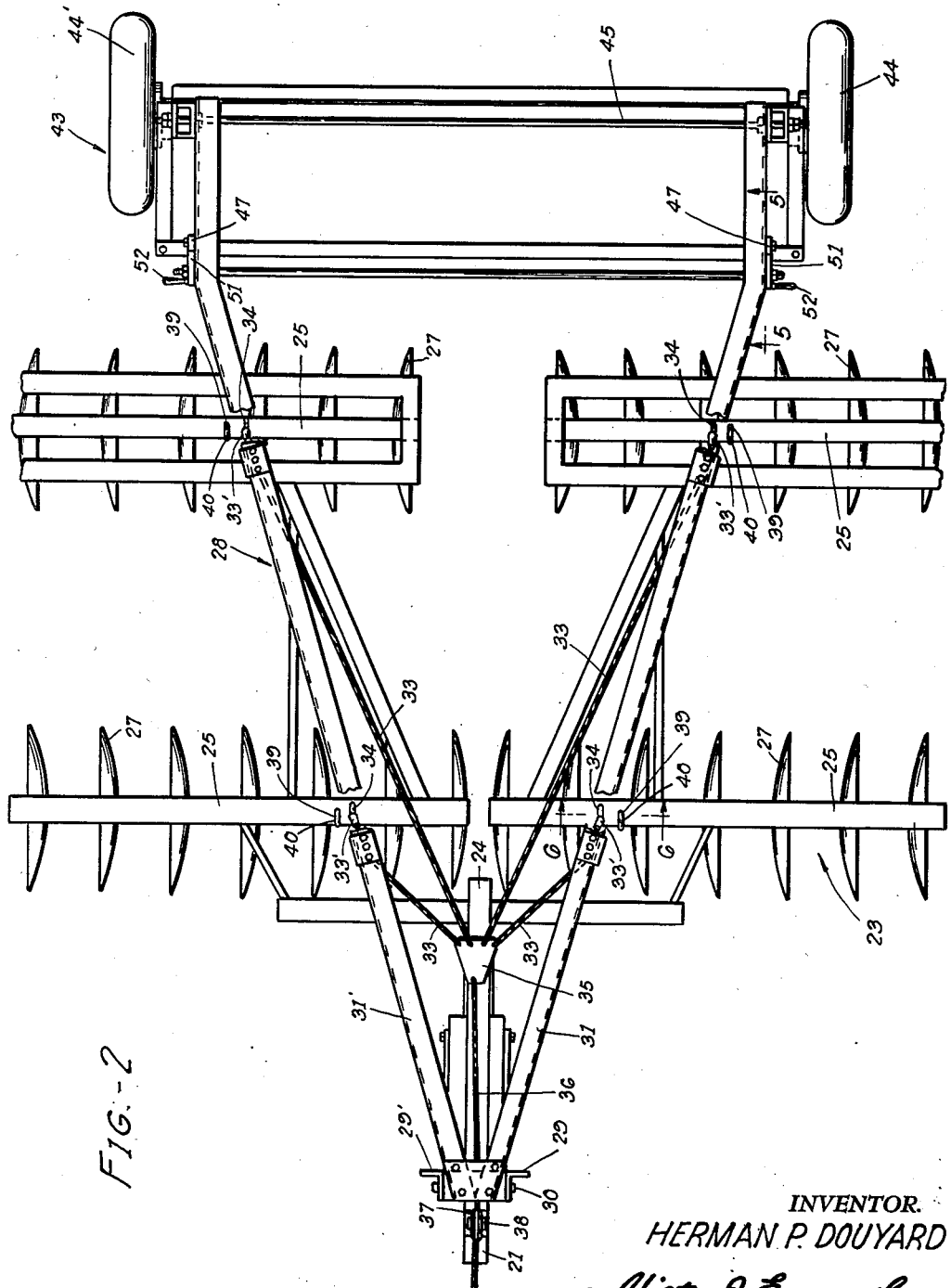

Dec. 16, 1952     H. P. DOUYARD     2,621,458
DISK HARROW CARRIER
Filed June 3, 1949     3 Sheets-Sheet 3
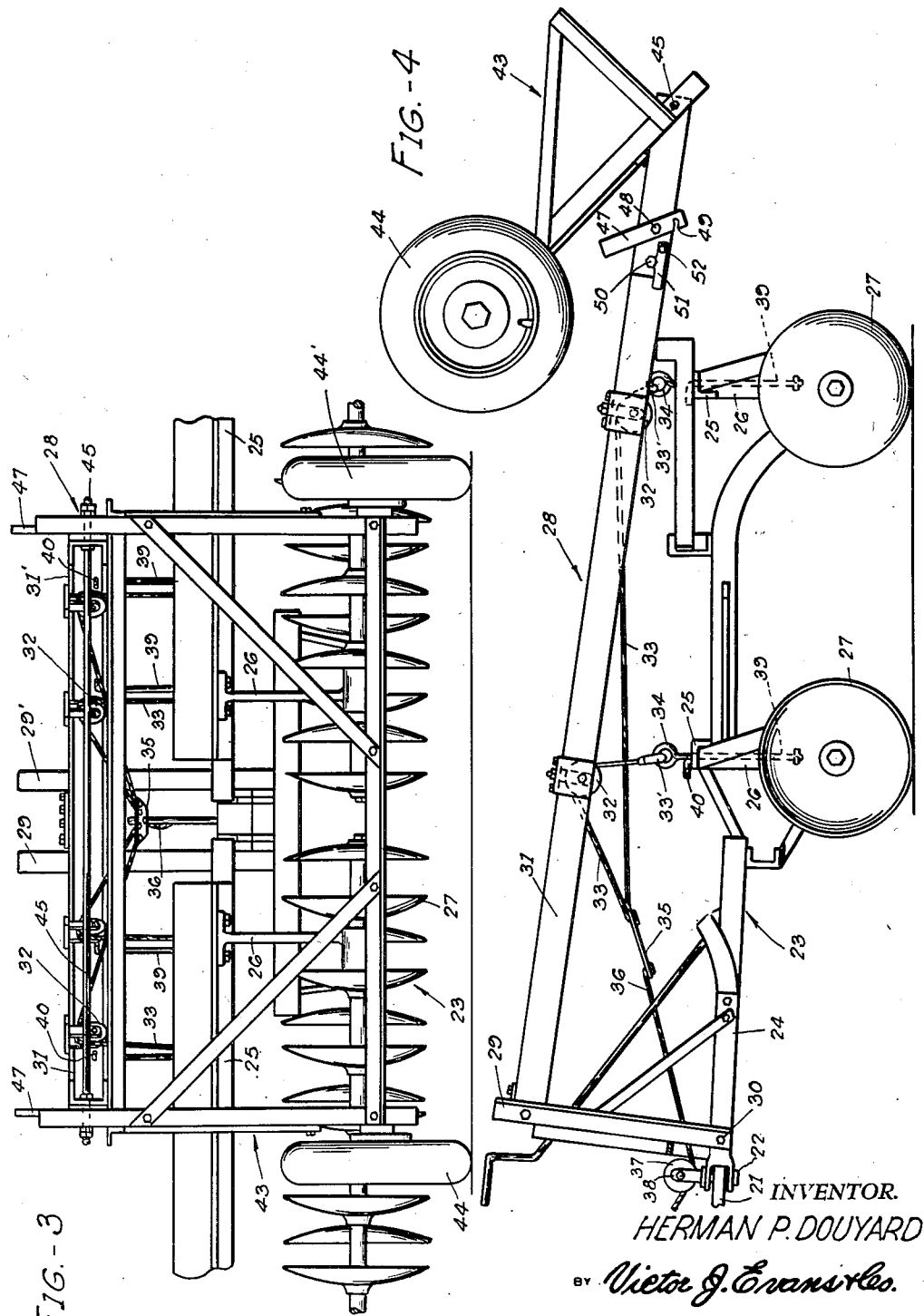
INVENTOR.
HERMAN P. DOUYARD
BY Victor J. Evans & Co.
ATTORNEYS Patented Dec. 16, 1952

2,621,458

UNITED STATES PATENT OFFICE 2,621,458

DISK HARROW CARRIER

Herman P. Douyard, Northampton, Mass.

Application June 3, 1949, Serial No. 96,937

2 Claims. (Cl. 55—73)

This invention relates to agricultural equipment, and more particularly to a carrier for a disc harrow.

The object of the invention is to provide a carrier for attachment to an agricultural implement, such as a disc harrow, the carrier being constructed so that the implement can be held out of contact with the ground for transporting the instrument along improved roads, and wherein the carrier can be arranged in an out of the way position when the implement is to be used in cultivating the land.

Another object of the invention is to provide a carrier which can be adjusted to an operative position and locked therein when it is desired to carry an implement such as a disc harrow over streets, or roads, without injury thereto, and wherein the carrier can be adjusted to an inoperative position to permit normal use of the implement in cultivation of a field.

A further object of the invention is to provide a disc harrow carrier which is simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view of the carrier for an implement such as a disc harrow, showing the position of the carrier when the implement is being transported along a road or street, and with parts of the carrier shown broken away and in section;

Figure 2 is a top plan view of the carrier, with parts thereof broken away, and with the carrier arranged in the position of Figure 1;

Figure 3 is a rear elevational view of the carrier, showing the carrier in the position of Figure 1;

Figure 4 is a side elevational view showing the out of the way position of the carrier when the disc harrow is being used;

Figure 5 is an enlarged sectional view taken on the line 5—5 of Figure 2; and

Figure 6 is an enlarged sectional view taken on the line 6—6 of Figure 2.

Referring in detail to the drawings, the numeral 20 designates a portion of a towing vehicle, such as a tractor, and projecting from the rear end of the tractor 20 is the usual draw bar 21. A pin 22 pivotally connects the front end of an implement, such as a disc harrow 23, to the rear end of the draw bar 21.

The disc harrow 23 is conventional and includes a bar 24, and arranged transversely with respect to the bar 24 is a plurality of horizontally disposed angle beams 25 which are fabricated preferably of angle iron. Each of the beams 25 have secured thereto a plurality of vertically disposed shanks 26 and the shanks 26 support the discs 27.

The present invention is directed to a carrier 28 which is constructed so that the disc harrow 23 can be transported along improved roads or streets, and during such movement the carrier and disc harrow are in the position shown in Figures 1, 2, or 3. Further, the carrier 28 is constructed so that normal use of the disc harrow 23 will not be impaired when a field is being cultivated.

The carrier 28 includes a pair of vertically disposed braces 29 and 29', Figure 2, and the braces each have their lower end pivotally connected to the bar 24 by means of a bolt and nut assembly 30. Connected to the upper ends of the braces 29 and 29' is a pair of arms 31 and 31' which are fabricated of suitable material, such as steel. The arms 31 and 31' are arranged so that their front ends converge towards each other and the arms 31 and 31' define a frame. Each of the arms 31 and 31' supports a plurality of pulleys 32 and a cable or rope 33 is trained over each of the pulleys 32. One end of each of the cables 33 has connected thereto a fastener 33', and the fastener 33' is arranged in engagement with an eye bolt 34, the eye bolt 34 being connected to the beam 25. The front ends of each of the cables 33 are connected to a plate 35, which has a substantially triangular shape, and a cable 36 has its rear end connected to the plate 35. The cable 36 is trained through a pulley 37 which is supported on the front end of the bar 24 by means of a bracket 38 and the cable 36 is connected to a suitable actuating mechanism on the tractor, such as a tractor lift arm, a hydraulic cylinder, or a small winch which may be located on the front end of the carrier 28. Thus, when a pulling force is applied to the cable 36, the disc harrow 23 will be lifted and after the disc harrow 23 has been lifted, a means is provided for sending or maintaining the disc harrow 23 above the ground, so that the discs 27 will not engage the ground.

A rod 39 is slidably connected to each of the beams 25 and each of the rods 39 are provided on its upper end with a transverse hook portion 40 which is adapted to be projected manually through a complemental opening 41 in the arms 31 or 31'. When the disc harrow 23 is lowered to the position shown in Figure 4, the hook portions 40 are not in engagement with the openings.

41, so that the rod 39 slides downwardly in the beams 25 of the disc harrow 23. When the disc harrow 23 is being supported above the ground, the rods 39 are in the position shown in Figures 1 and 6 so that the disc harrow 23 is supported safely above the ground. A nut 42 is arranged in threaded engagement with the lower end of each of the rods 39 for preventing the rods 39 from slipping through the beams 25 when the disc harrow 23 is in its raised inoperative position.

A pin or shaft 45 pivotally connects a body member 43 to the rear end of the arms 31 and 31'. The body member 43 carries a pair of rubber tired wheels 44 and 44' which are adapted to be moved into and out of engagement with the ground when the body member 43 is pivoted about the pin 45. Thus, when the disc harrow 23 is being transported across a road or street, the support member 43 and wheels 44 and 44' are in the position shown in Figures 1, 2 and 3; and when the disc harrow 23 is being used for cultivating a field, the body member 43 which carries the wheels 44 and 44' is pivoted to the position shown in Figure 4, so that the body member and wheels are supported on top of the arms 31 and 31'.

A locking means is provided for maintaining the body member 43 and the wheels 44 and 44' in engagement with the ground when the disc harrow 23 is being transported. This locking means comprises a horizontally disposed angle iron 46 which is secured, as by welding, to the body member 43. A latch 47 is pivotally connected to each of the arms 31 and 31' by means of a bolt and nut assembly 48, the latches 47 being arranged adjacent the rear end of the arms. The latch 47 is provided with a slot 49 for receiving therein a portion of the angle iron 46 when the body member 43 is at the lowered position shown in Figures 1, 2, 3 and 5. A bolt and nut assembly 50 pivotally connects a plate 51 to each of the arms 31 and 31', and for causing pivotal movement of the plate 51, a handle 52 is secured thereto. Thus, to lock the body member 43 in position, as when the disc harrow 23 is being transported along a street or road, the latch 47 is arranged so that its slot 49 receives therein a portion of the angle iron 46. Then, the user grips the handle 52 and moves the plate 51 to the position shown in Figure 5, wherein the latch 47 will be maintained immobile so that accidental movement of the body member 43 will be prevented.

In use, the carrier 28 can be used for either transporting the disc harrow 23 or other implement along an improved road. Thus, to transport the harrow 23, the body member 43 is moved to the position shown in Figures 1, 2, 3 or 5. Then, the latch 47 and plate 51 are arranged so that the wheels 44 and 44' and the body member 43 cannot move or pivot in a counterclockwise direction. Next, by means of a suitable actuating mechanism on the tractor 20, the cable 36 is pulled forwardly and this raises the disc harrow 23. Then, the hook portions 40 of the rods 39 are inserted through the complemental openings 41 in the arms 31 and 31' to provide a support for the disc harrow 23. When it is desired to use the disc harrow 23 during normal cultivation of a field, the above described procedure is reversed. Thus, the user grips the handle 52 and pivots the plate 51 so that the latch 47 can be moved out of engagement with the angle iron 46. Then, the body member 43, which carries the wheels 44 and 44', is pivoted to the position shown in Figure 4 whereupon the discs 27 will move into engagement with the ground. The hook portions 40 of the rods 39 having been freed from engagement with the openings 41 in the arms 31 and 31' whereby the disc harrow 23 can now be used as desired. The apparatus is so constructed that the disc harrow 23 can be moved from its ground engaging position to its position when being carried, or vice versa, in a very short period of time.

What I claim:

1. In an agricultural machine, the combination with a disc harrow adapted to be attached to a towing vehicle, of a carrier operatively connected to said disc harrow, said carrier including a frame disposed above said disc harrow, means connecting the front of said frame to the front of said disc harrow, a support member pivotally connected to the rear of said frame, a pair of wheels carried by said support members, whereby upon pivotal movement of said support member, said wheels move into and out of engagement with the ground, manually operable locking means for maintaining said wheels in engagement with said ground, a plurality of pulleys carried by said frame, cables trained over said pulleys and connected to said disc harrow for raising the latter upon application of a pulling force on said cables, and rods for dependingly supporting said disc harrow from said frame when said wheels are in engagement with the ground.

2. In an agricultural machine, the combination with a disc harrow including a bar for attachment to a towing vehicle, and a plurality of spaced parallel horizontally disposed beams, of a carrier operatively connected to said disc harrow, said carrier comprising a frame, said frame including a pair of spaced braces having their lower ends pivotally connected to said bar, a pair of arms having their front ends connected to the upper ends of said braces, a plurality of pulleys connected to said arms, cables trained over said pulleys and connected to the beams of said disc harrow for raising the latter upon movement of said cables, rods connected to said beams and adapted to be connected to said arms for supporting said disc harrow off the ground when the disc harrow is being transported, a support member pivotally connected to the rear of said frame, and a pair of wheels carried by said support member whereby upon pivotal movement of said support member said wheels move into and out of engagement with the ground.

HERMAN P. DOUYARD.

REFERENCES CITED

The following references are of record in the file of this patent:

UNITED STATES PATENTS

| Number | Name | Date |
|---|---|---|
| 1,698,724 | Johnston et al. | Jan. 15, 1929 |
| 2,141,805 | White | Dec. 27, 1938 |
| 2,454,675 | Showalter | Nov. 23, 1948 |
| 2,500,700 | Niles | Mar. 14, 1950 |
| 2,517,160 | Alphin | Aug. 1, 1950 |